July 4, 1933.  J. W. BRYCE  1,916,961
GROUP INDICATING SYSTEM
Filed Sept. 5, 1928  3 Sheets-Sheet 1

Inventor
James W. Bryce
By his Attorney

July 4, 1933.    J. W. BRYCE    1,916,961
GROUP INDICATING SYSTEM
Filed Sept. 5, 1928    3 Sheets-Sheet 2
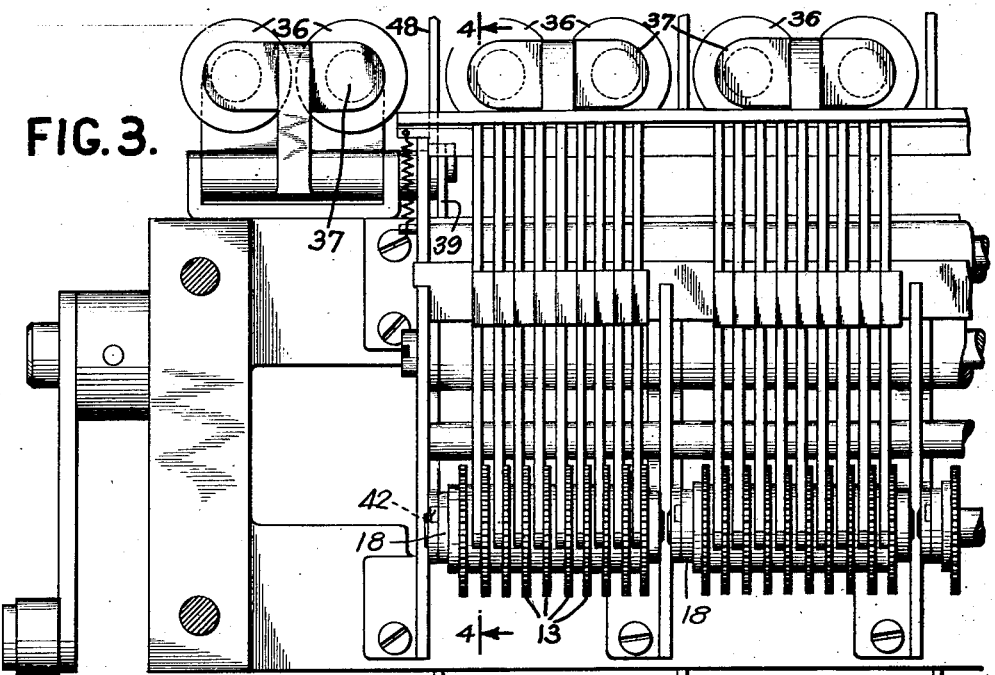
FIG. 3.
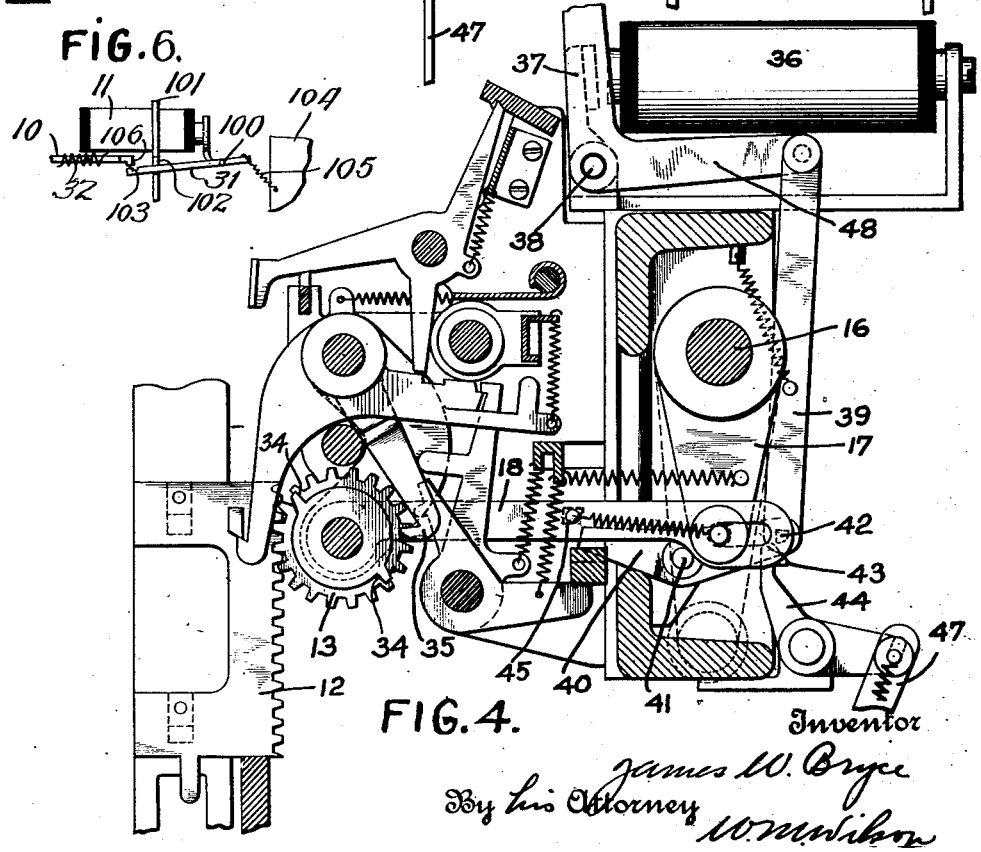
FIG. 6.
FIG. 4.
Inventor
James W. Bryce
By his Attorney
W. M. Wilson Patented July 4, 1933

1,916,961

UNITED STATES PATENT OFFICE

JAMES W. BRYCE, OF BLOOMFIELD, NEW JERSEY, ASSIGNOR TO THE TABULATING MACHINE COMPANY, OF ENDICOTT, NEW YORK, A CORPORATION OF NEW JERSEY

GROUP INDICATING SYSTEM

Application filed September 5, 1928. Serial No. 304,139.

This invention refers to accounting machines and more especially to record card controlled tabulating machines.

As is well known in the art these machines are controlled preferably by record cards having perforated index points, representing generally certain amounts as, for example, wages, weights, etc. and coordinated designating features, such as workman-numbers, article-numbers, etc. usually defined as group numbers. The tabulating machine controlled by record cards assorted according to different groups then accumulates all amounts and prints the total. In order to identify the printed total it is necessary to print together with this total the group number and it is further desirable if the single items representing the group are printed to print the group number also opposite the first item of the group.

This invention provides a new method and new and improved mechanisms for group indicating purposes. One embodiment of the invention is shown in the following specification and attached drawings in combination with a tabulator having rack bars moved up and down and under the control of record cards. The rack bars control the adjustment of an accumulator and are provided with type carriers to print items corresponding to those entered into the accumulator and also to print a total under the control of the accumulator. According to the present invention one of the accumulators ordinarily receiving items is employed as a group indicator and receives the first group number in the usual way, that is, the accumulator employed as a group indicator is de-meshed from the racks upon the up stroke of the racks and is then enmeshed on the down stroke of the racks for the first card cycle. This sets the group number from the first card into the accumulator. Then on the next following up stroke the accumulator in place of being disabled permanently for all following cards of a group or of accumulating successive group numbers has its action modified so that on the up stroke of the racks the accumulator remains in mesh with the racks with the result that the amount previously in the accumulator is turned back to zero. Then when the racks come down the enmeshment is maintained so that the amount which has been represented by the variably displaced racks is again entered back into the accumulator.

This continues until a card group changes whereupon the accumulator is first meshed with the racks at the beginning of the up-stroke and de-meshed from the racks at the end of the up stroke after it has been turned back to zero and after it has controlled the racks so as to print the group number. This de-meshment is retained during the return of the racks and also during the first up stroke movement of the racks coincident with the first card of the new group. As it is desirable to print the group number also with the first item and prevent printing of the group number for all following items, provisions are made to control simultaneously with the mesh control device for the accumulator a locking mechanism for the printing device to obtain the above mentioned result.

While the invention is shown in combination with a tabulator, it is not limited to this kind of machine and it may be understood that the main object of the invention is to provide a new group indicator and new group indicating method for accounting machines.

Another important object of the invention is to automatically reset an entry receiving device after each item entry.

A further object of the invention is to provide for the particular group indicating purpose an ordinary accumulator which may be used at will for group indicating purposes or for ordinary accumulating.

Another object of the invention is to provide an accumulator engaged with rack bars during their down stroke with provisions except on change in card groups to keep the accumulator meshed with the racks during the following up stroke to clear the accumulator.

A further object of the invention is to provide a tabulating machine with automatic group control mechanism and a new group indicating mechanism, said group indicating mechanism being under the control of the automatic group control mechanism.

Other objects and advantages will be hereinafter set forth in the accompanying specification and claims and shown in the drawings which show by way of illustration what is now considered to be the preferred embodiment of the invention.

In the drawings:

Fig. 3 is a front view of the accumulating device and the controlling devices shown in Fig. 4 showing the construction in the tabulator embodying the improvements.

Fig. 4 is a sectional view taken on the line 4—4 of Fig. 3 showing in detail the accumulator and its cooperation with the related controlling means.

Fig. 6 is a detail of the device used for controlling the setting of an actuating device.

The present invention will be described in connection with a well known type of tabulator fully described in the patent to Peirce, No. 1,780,685, dated November 4, 1930. The present specification will describe certain parts of such a machine only to the extent necessary for an understanding of their cooperation with the present invention.

Figure 1:
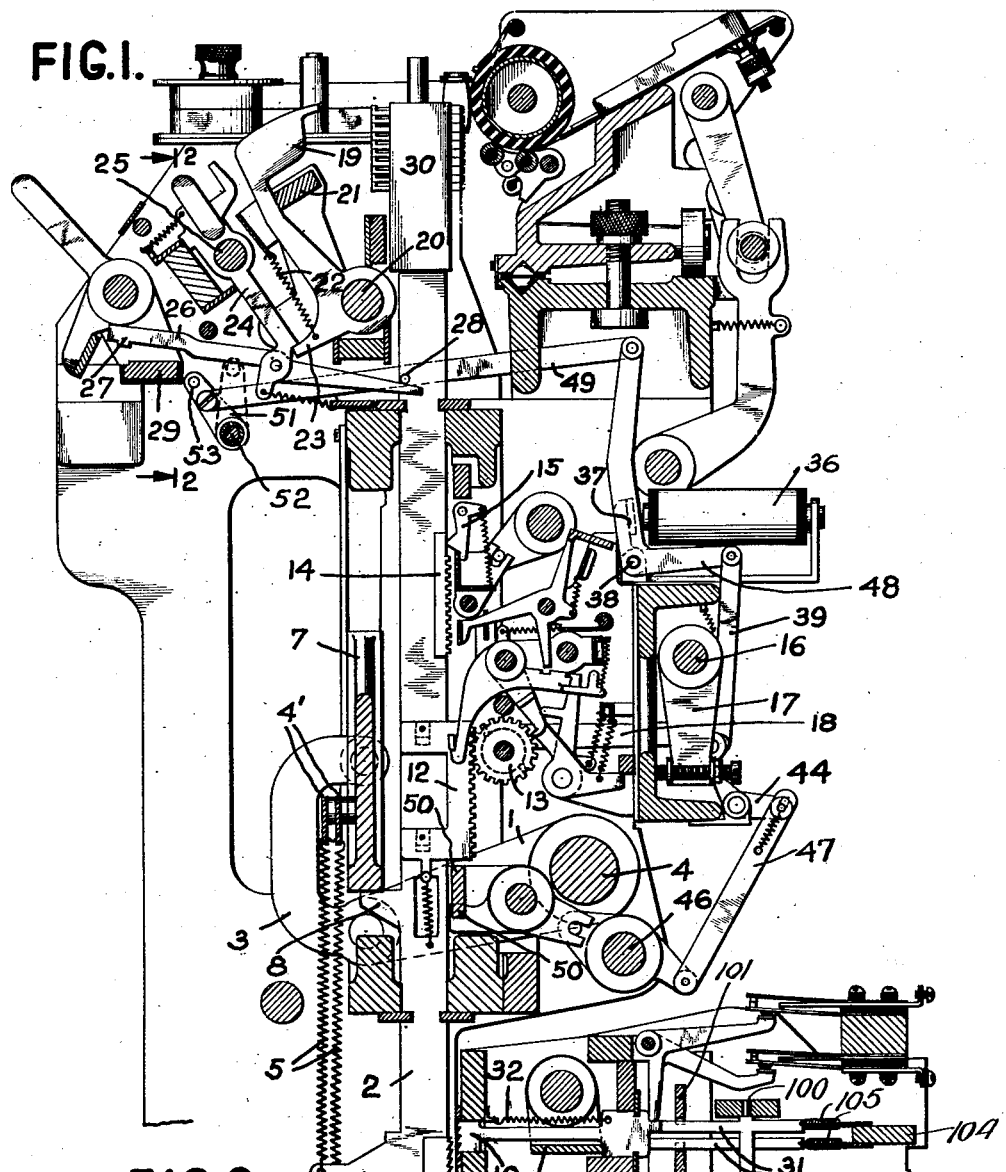
Fig. 1 is a sectional view disclosing one order of the accumulating and printing devices of the tabulator embodying the present improvements.
Figure 2:
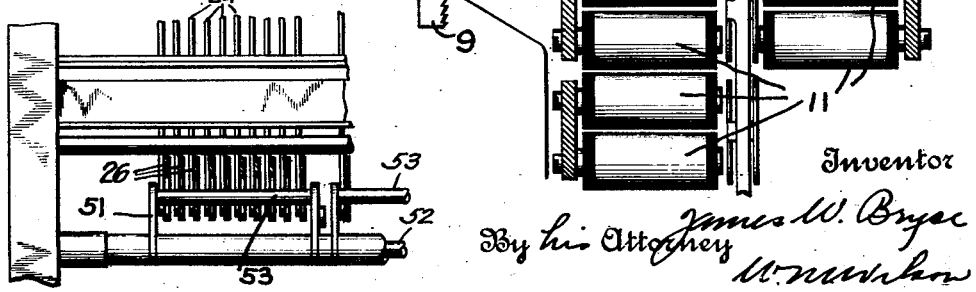
Fig. 2 is a sectional view taken on the line 2—2 of Fig. 1.
Figure 5:
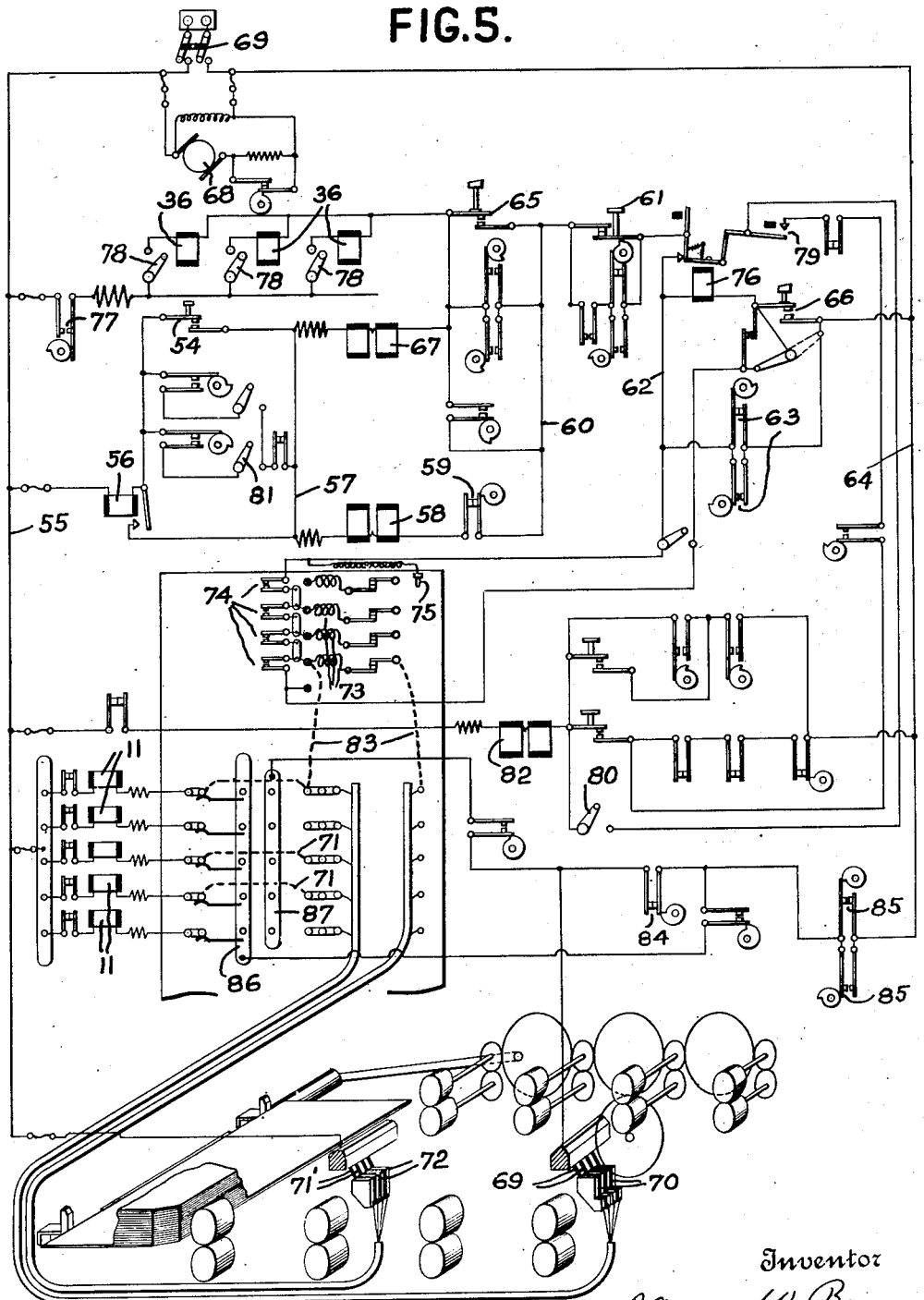
Fig. 5 is a wiring diagram of a tabulator provided with a controlling device constructed according to the invention.

In Fig. 1 of the attached drawings there is shown one order of the accumulating and printing devices as well as the coordinated controlling means of the tabulator, while the coordinated card feed mechanism and analyzing means are shown more schematically in the wiring diagram of Fig. 5. The general operation of the mechanical parts may be best explained by means of Fig. 1. When cards are fed through the machine, a bar 2 is moved up and down, the up-stroke occurring in synchronism with the passage of a card under the analyzing brushes. Movement of the bars 2, of which one is provided for each card column, is effected by a frame 3 to which is connected a lever 1 actuated by a shaft 4. The shaft 4 corresponds to shaft 85 of the Patent 1,780,685 and is rocked by the mechanism shown in the patent provided for raising and lowering the bars 2. Frame 3 is provided with cross bars 4' carrying springs 5 which are connected at their lower ends with projections 6 of the bars 2.

By means of restoring bar 7, which coacts with extensions 8, the bars 2 are restored to their normal position after each up-stroke. Each bar 2 is provided on its lower end with a ratchet member 9 cooperating with a stop latch 10, there being one such latch for each bar 2. Each latch is controlled by one of the magnets 11, each of the latter being adapted to control only the related latch. The upper end of bar 2 is formed as a type carrier 30 having numeral types to print numbers. Slidably fastened on each bar 2 is a rack 12 cooperating with an accumulator wheel 13, here employed as an element of a group indicator. A rack member 14 cooperating with a pawl 15 serves to hold bar 2 in any of its different printing positions. At the presentation of the first card of the first group or each new card group the wheel 13 is demeshed from rack 12 during the up-stroke but meshed therewith during the down-stroke of the controlling bar 2. Shifting of the accumulator in and out of engagement with racks 12 is effected in the following way (Figs. 1 and 4). The shaft 16, which corresponds to shaft 234 of the machine of Patent #1,780,685 is rocked during each tabulating operation. It is provided with an arm or lever 17 which, in turn, operates link 18 through a pin and slot connection. The link 18 is adapted to shift the accumulator into mesh with racks 12 at the end of the up-stroke of the bars 2 occurring during the first machine cycle of the first card of a group to turn the accumulator wheels during their down-stroke and if the card group changes to again engage the accumulator with the racks at the beginning of the up-stroke and disengage the accumulator at the end of the up-stroke in the total taking cycle and retaining the disengagement during the down-stroke so that no meshing during the following up-stroke takes place as such upstroke occurs in a tabulating operation which is coincident with the first card of a new group.

At the end of the up-stroke the hammers 19 are actuated to accomplish printing of the group number of a group of cards. The type hammers 19 are pivoted upon a shaft 20 and are drawn by springs 22 to engage latching members 24. Latching members 24 are pivoted upon a common shaft 25 and carry pivoted levers 26 provided with lugs 27. A stop pin 28 on the related bar 2 normally holds an extension of lever 26 down so that lug 27 may not normally cooperate with a bail 29. If the type bar rises beyond the zero position, lever 26 is rocked sufficiently to allow cooperation of lug 27 with bail 29. After the type bars have been positioned, bail 29 is then shifted to the left (by means disclosed in the Peirce Patent #1,780,685) thus moving latches 24 to cause unlatching of type hammers 19 so that a group number, corresponding to the adjustment of the type bars effected under control of perforations of the first card of a new group may be printed on the record sheet.

The normal operation of the machine under perforated record card control may now be easily understood. The cards in the present machine are fed with their "O" index points leading, contrary to the usual practice. Bars 2 are raised synchronously with the passage of the card perforations under the brushes. If a brush in any column encounters a card perforation, the coordinated controlling magnet 11 will be energized to attract its armature and shift a lever 31 connected therewith (see Fig. 6).

The latter is rockable on a pivot 100 (see Figs. 1 and 6) and is normally urged in a clockwise direction by a spring 105 connected to the rear end of the lever 31 and a frame plate 104. The forward end of the lever is provided with a notch 103 which normally engages a lip 106 to prevent movement of the latch 10 under influence of spring 32. When the magnet 11 is energized, upon the sensing of an index point in the record card, the lever 31 is rocked counterclockwise (as viewed in Fig. 6) against the action of spring 105, this movement of the lever being limited by contact of the lower edges of the lever with the end of a slot 102 in a fixed plate 101. As a result of the counterclockwise movement of lever 31, lip 106 is released from the notch 103 and spring 32 is now effective to shift latch 10 into engagement with related rack 9 of bar 2, thus stopping the latter in a differential position corresponding to the index point which had been sensed.

In consequence of the provision of springs 5, the frame 3 can move independently of the arrested bars 2 up to its highest position. During this movement, as all type bars have been adjusted according to the card perforations, printing takes place in the above described manner. Before bars 2 start their down-stroke, the accumulator wheels 13 are shifted to mesh with racks 12 as has been already explained. It is obvious that during the down-stroke an amount is entered into the group indicator or accumulator wheels 13 corresponding to that which is represented by card perforations and which has been printed. Stop latches 10 are restored by a bail 33 (operated by means disclosed in the patent) at the end of each machine cycle to be ready for release during the next card analyzing operation.

As the machine is also provided with item accumulators as explained in Patent #1,780,685 all items represented on the other fields of the analyzed cards are printed on a report sheet and entered into the related item receiving accumulators to obtain a total of all items. Total taking from such accumulators may be initiated by hand, or automatically on change of a card group. During the total taking cycle shaft 16 is actuated by means disclosed in Patent #1,780,685 at the beginning of the cycle to engage accumulator wheels 13 with racks 12 before their up-stroke; thereby wheels 13 are turned towards their zero position and when they reach this position they are stopped and therefore, stop the printing type 30 at a differential position because zero lug 34 engages its coordinated hook 35. This action not only occurs in connection with the item accumulators but also with the accumulator wheels 13 used as a group indicator. Hence, in total taking operations, the group indicator controls the setting of the printing bars and the group number is again printed with the totals.

It will be noticed then that bars 2 are stopped in a corresponding position, i. e. in a position corresponding to the total represented on the accumulator. Total printing now may be effected from the item accumulators in the manner explained in the Patent #1,780,685 and the controlling bars may be restored by means of the restoring bar 7 into their normal position but now demeshed from the accumulator during the down stroke.

The operation of the accumulator and printing device will be described as far as it refers to the mechanical parts of Figs. 1 to 4 and 6.

As has been mentioned in the introduction, according to this invention, an entry receiving device, preferably an ordinary accumulator is used for group indicating purposes. It will be understood, as stated, that beside the accumulator used as a group indicator, there are a plurality of item accumulators provided for totaling of items. The improvement is also controlled by the group control mechanism of the tabulator which controls total taking from the item accumulators as will be described more in detail later, especially in connection with the wiring diagram.

For each accumulator adapted to be used as a group indicator, according to this invention, there is provided a magnet 36 which may be called the group control magnet. Armature 37 of the group control magnet is mounted loosely upon a shaft 38 and is connected with a bell crank lever 48. One arm of this lever cooperates with a locking mechanism for preventing operation of the printing device while the other arm cooperates with the shifting mechanism of the accumulator. Horizontal arm of lever 48 (Fig. 4) is pivotally connected with a link 39 which is connected at its lower end by a pin 42 to a lever 40, which in turn, is pivoted upon shaft 41. The lower pivot pin of link 39 is formed with a straight edge adapted to be engaged by a hook 43 of a latch lever 44 when link 39 is pushed down effected when magnet 36 is energized. As may be seen from Fig. 4 of the drawings, the left arm of lever 40 will abut a stop pin 45 fixed to the link 18 when magnet 36 is energized when the accumulator is in meshing position and, therefore, accumulator 13 remains in mesh with racks 12 if magnet 36 is energized because hook 43 of lever 44 holds lever 40 in its shifted position abutting pin 45 prevent movement of link 18 to the right.

At the end of a card group, and during the total taking cycle, shaft 46 (Fig. 1) (corresponding to shaft 306 of Patent #1,780,685) will rock counterclockwise to actuate bail 50 as may be recognized from Fig. 1 to restore those racks 12 which were used in transferring operations during the last accumulating cycle, all of which is fully described in the Patent #1,780,685. When shaft 46 rocks counterclockwise the link 47 will be forced or pushed upwardly thus rocking in a counterclockwise direction the latch lever 44 to which the link 47 is connected. By pushing link 47 upwardly hook 43 will release pin 42 so that normal shifting operation under the control of shaft 16 and lever 17 may take place during the total taking cycle as explained in Patent #1,780,685.

On the vertical arm of bell crank lever 48 is pivotally connected a member 49 which is connected with one arm 51 of a frame which is loosely mounted upon shaft 52. The frame is provided with a cross rod 53 which is common to all levers 26 related to the accumulator 13. If magnet 36 was energized and parts 48, 49 and 51 are held in a locking position, frame 51 will prevent levers 26 from turning counterclockwise, as viewed in Fig. 1 and in consequence thereof the type hammer associated with the bar 2 controlled by magnet 11 may not be released, that is, number printing by said bar is prevented when the described device is in a locked position and which occurs upon the change in card groups and after permitting the printing of the first group number.

The sequence of operations referring to the group indicator is as follows: When the first card of a group passes through the machine bars 2 will be raised simultaneously with the passage of the perforations of the card under the analyzing brushes. During this up-stroke the accumulator 13 is demeshed from rack bars 12 in the usual manner. Magnets 11 are controlled by the perforations in the first card and stop the bars 2 in a position corresponding to the perforated group designation. At the end of the up-stroke the type hammers will be actuated in the above described manner, thus effecting the first printing of the group designation. During the down-stroke the accumulator is shifted in the known manner into meshing position (by rocking of shaft 16 and lever 17) so that the group number is entered into the accumulator during the down-stroke of the bars. Meanwhile the group representing perforations of the first card have been compared by means of the two sets of brushes with the group representing perforations of the following card, and if the perforations agree, control magnet 36 will be energized at the end of the down-stroke of the first machine cycle. This causes the accumulator to be held in mesh with racks 12 and link 39 will rock latch 40 into path of the stop pin 45 to prevent the accumulator 13 from demeshing with the racks 12.

The pin and slot connection of lever 17 to the accumulator meshing control link 18 (Fig. 4) permits continuous meshing of the accumulator although shaft 16 and lever 17 are rocking for each machine cycle occurring while cards are being analyzed. When latch 40 is thus moved at the end of the first card tabulating machine cycle it is latched in latching position by latch 44 and held latched until total taking. In the event that there is only a single card of the same classification, racks 12 are raised idly without engagement with pinions 13 and latch 44 is effective only during the subsequent down-stroke of the racks in the cycle involving the tabulation of this card. Also as frame 51 has been moved to a locking position for preventing operations of the printing device it remains latched in this position until total taking so that after printing the first group number, printing of all subsequent group numbers designating cards of the same group will be prevented. Of course, it will be understood that besides this group indicating unit there are one or a plurality of other item accumulators and printing units by which item printing of all amounts may be effected at will, while the group number is only printed together with the first amount and later on, as will be seen, a second time together with the total from the item accumulators.

It may be recognized that as long as group indications agree, on each machine cycle, the rack bars controlled according to the group designation will enter the group number into the accumulator during their down-stroke while the accumulator is reset during the following up-stroke and the same number is entered again during the following down-stroke and so on.

It is, therefore, obvious that the accumulator 13 contains the group number of the last card entered during the last down-stroke when the group number changes and a total has to be taken. As has been explained above, at the end of the last cycle of a group, the shifting lock mechanism according to this application is released during total taking operation by rocking lever 44. The accumulator 13 is then under the normal total taking control of shaft 16, lever 17 now being operated, thus engaging the accumulator 13 with racks 12 during the beginning of the total taking up-stroke. Thereby the accumulator 13 is reset to zero and stops bars 2 in positions corresponding in value to the representations on the accumulator wheels so that the number on the accumulator is set on the type bars 30. The type hammers are now free to operate to print the group number. As item accumulators are provided the group number together with totals from the item accumulators will be printed by the present arrangement. The type bars related to the item accumulators are differentially set during total taking operations in a manner similar to that described.

The cooperation of the above described device with the group control mechanism of the tabulator will now be described by means of circuit diagram of Fig. 5 but explaining only briefly the operation of parts not belonging directly to this invention as a detailed specification is given in the previously referred to patent.

When start key 54 of the machine is depressed the corresponding contacts will close and a circuit will be established from the positive line 55 through holding magnet 56, start key contacts 54, line 57, card feed clutch magnet 58, contacts 59, line 60, contacts of stop key 61, line 62, cam contacts 63, now closed to the negative line 64. When card feed takes place, card lever contacts 65 and 66 will be closed and machine shaft clutch magnet 67 will be energized. (Of course motor 68 is in operation when at first the tabulator is connected by switch 69 with the current supply). The circuit for magnet 67 is then established over holding relay 56, line 57, magnet 67, contacts 65, stop key contacts 61, wire 62, contacts 63 and back to line 64.

When cards are fed through the machine in the usual way, the data are analyzed by brushes 69 and corresponding contact blocks 70, and the magnets 11, connected with contact blocks 70 by plug wires 71 are controlled by the perforations to control in turn the rack bars 2 as has been explained previously. Brushes 71' and blocks 72 analyze identical index points of the subsequent cards to compare the group numbers and to control conjointly the group control mechanism. The well known group control device consists of a plurality of magnets 73 and coordinated contacts 74 which will be closed by their magnets if they are energized. By a plug 75 the contacts 74 not used for group control may be eliminated from the control circuit. Within the circuit of contacts 74 are arranged contacts 63, which open at the end of each machine cycle, and magnet 76. When at the end of the machine cycle contacts 63 open, this does not effect the machine operation provided the parallel circuit over all contacts 74 is closed which is the case when two subsequent cards agree.

However, at the same time cam contacts 77 are momentarily closed thus effecting energizing of magnets 36 one being provided for an accumulator to be used for group indicating purposes. Of course, the selected magnets 36 must be connected with the circuit by switches 78. It will be remembered that by energization of control magnet 36 at the end of the first card cycle provided the first two cards agree in their group number the shifting and locking mechanism according to this invention is actuated as has been already described in detail. If, however, the group changes, i. e. if any of the contacts 74 would be open at the end of a machine cycle, there would be no short circuiting of magnet 76 but this magnet would be energized thus interrupting the circuit of the machine shaft clutch magnet 67 and of the card feed clutch magnet 58 as may easily be seen from Fig. 5. But simultaneously contacts 79 will be closed and if switches 80 and 81 provided for selective automatic total taking are closed, total clutch magnet 82 will be energized immediately to initiate total taking.

For automatic group control, magnets 73 are connected by plug wires 83 with plug sockets coordinated to the analyzing blocks of the respective card columns. When in any column the perforations of two subsequent cards agree, a current will flow from positive line 55, brush 71', block 72, right plug wire 83, magnet 73, left plug wire 83, coordinated contact block 70, brush 69, contacts 84, 85 being normally closed, to the negative line 64. Common electrical bars 86, 87 are provided for stopping bars 2 in the zero position and for carrying purposes if the capacity of the used accumulator should be too small so that it becomes necessary to effect transfers to a second accumulator.

It is believed that the above explanation of the cooperation of the circuits for the purpose in mind will be sufficient to give a full understanding of the control of the mechanical operation while further details not involved in this invention are explained in the above mentioned application disclosing a machine in which the present invention is used.

While there has been shown and described the fundamental novel features of the invention as applied to a single modification it will be understood that various omissions and substitutions and changes in the form and details of the device illustrated and in its operation may be made by those skilled in the art without departing from the spirit of the invention. It is the intention therefore to be limited only as indicated by the scope of the following claims:

What is claimed is:—

1. In a record controlled tabulating machine, an entry receiving device adapted to receive entries from the records, means for comparing index points of successive records and means controlled by said comparing means for automatically causing resetting of said entry receiving device and then re-entering the first item entry as long as subsequent cards have identical index points.

2. In an accounting machine, an entry receiving device, a printing device, means to control said devices according to an item to be entered, mechanism for automatically causing resetting of said entry receiving device and then reentering the first item entry and means controlled by said mechanism to prevent further printing of the item entered after it is once printed.

3. In an accounting machine, an entry receiving device, means to control entering of items into said entry receiving device, a printing mechanism with printing actuating means, means to control the printing mechanism in accordance with the entry receiving device, means to normally operate the printing actuating means for each item entry, mechanism for automatically causing resetting of said entry receiving device after each item entry and then re-entering the first item entry in combination with means controlled by said mechanism for locking the printing actuating means.

4. In a record card controlled tabulating machine, an entry receiving device, a printing device, means to control said devices according to the items of the records passing through the machine, means for comparing index points of successive records and means controlled by said comparing means for automatically resetting said entry receiving device and then re-entering the item entry and to prevent further printing of the item entered after it has been once printed.

5. In a record controlled tabulating machine, an entry receiving device controlled by record designations, means to enter the designation of the first record into the entry receiving device, group control means controlling the operation of the entry receiving device to clear the entry receiving device from the preceding record designation and to enter the same designation from each following record as long as the designations of subsequent cards agree.

6. In a tabulating machine for operating upon groups of record cards, means for comparing group number designating index points of successive cards, printing devices, means effective during card tabulating operations for setting the printing devices once for each card of a first or group to represent the group designation thereof, means for effecting the printing from the printing devices during one of the setting operations, and means controlled by the comparing means when there is a change in group number designations for again setting the printing devices to represent the group number first or for a printing operation by the printing means.

7. In a machine controlled by records having different group numbers, a printing means including hammers operable for printing the group number of the initial record, means for preventing operation of the hammers so that further printing is suppressed as long as successive records are alike, a group number representing device, means for controlling the entering of the group number, and means effective upon a change in group numbers and controlled by the group number representing device for setting the printing means to again print the group number of the initial record and for disabling the hammer operating preventing means.

8. In an accounting machine, an entry receiving device, controlling means having two strokes of operation, means to shift said entry receiving device for engagement with its controlling means, and means for locking said shifting means in shifted position after an idle stroke of the controlling means and only during the following stroke of the controlling means while engaged with said entry receiving device to enter a number in the entry receiving device.

9. In a record controlled tabulating machine, an entry receiving device, a two-stroke controlling means therefor, means to shift said entry receiving device for engagement with the controlling means, analyzing means for comparing data of successive records to be entered in said entry receiving device and means controlled thereby to modify the operation of the machine in accordance with the result of comparison of successive records, and locking means controlled by the analyzing means for locking said shifting means after the first idle stroke of the controlling means to lock said entry receiving device in engagement with said controlling means during the subsequent stroke of the latter.

10. In a tabulating machine, an entry receiving device adapted to receive entries under control of index point designations of records, a printing device, a record controlled group control mechanism, means controlled by the group control mechanism for automatically causing after an entry the resetting of said entry receiving device and then re-entering the first item entry as long as successive records have identical index point designations, and means for adjusting the printing device under control of the entry receiving device when the index point designations of successive records are non-identical.

11. In a tabulating machine, an entry receiving device, reciprocating controlling racks therefor, means to shift the entry receiving device for cooperation with the controlling racks, means whereby said racks in one reciprocation are adjusted under control of classification index point designations of the records to set said entry receiving device, and means to lock said shifting means to cause continued engagement of the entry receiving device and said racks for each subsequent reciprocation thereof when and as long as classification index point designations of successive records agree.

12. In a tabulating machine, an entry receiving device controlled by record designations, means to enter the designation of the first record of a group into the entry receiving device, a printing device and controlling means therefor to cause the printing of the designation of the first record, group control means controlling the operation of the entry receiving device to clear the entry receiving device from the preceding record designation and enter the same designation from each following record as long as the designations of successive cards agree, means whereby the group control means prevents, as long as designations of successive cards agree, further printing of the record designation after the designation is once printed, and means controlled by successive records effective upon a change in designation whereby the printing device is adjusted under control of the entry receiving device to again print the designation which was once printed.

13. In a record controlled tabulating machine, an entry receiving device, reciprocable rack bars, shifting means to engage the entry receiving device with the rack bars during the second stroke of the first reciprocation of said bars, a printing device, type hammers, a group control mechanism controlling said shifting means to cause continued engagement of the entry receiving device and said racks for each reciprocation thereof as long as designations of successive cards agree, means to lock said hammers against operation after the designation of a group of records has once been printed to prevent further printing of the designation, and means controlled by the cards effective upon a change in designation for causing said printing device to be adjusted under control of said entry receiving device and for causing the disabling of the hammer locking means.

14. In a machine controlled by groups of records, an entry receiving device, means including devices effective upon the presence of the first record of the first group and when the group numbers change for initially causing the representing on the entry receiving device of a group number, and means for causing said devices to effect subsequent subtracting out said number entry from said entry receiving device and then re-entering said number whereby the initial group number entry on said entry receiving device is represented after a re-entry operation as long as successive records have the same group number.

15. In a machine controlled by groups of records, an entry receiving device, means effective upon the presence of a record of the first group and when group numbers change for initially entering on said receiving device a group number, and means effective after the initial entry of a number for causing the zeroizing of such entry and each subsequent entry as long as successive records have like group numbers.

In testimony whereof I hereto affix my signature.

JAMES W. BRYCE.